US012282285B2

(12) United States Patent
Taniguchi

(10) Patent No.: US 12,282,285 B2
(45) Date of Patent: Apr. 22, 2025

(54) IMAGE FORMING APPARATUS

(71) Applicant: KYOCERA Document Solutions Inc., Osaka (JP)

(72) Inventor: Susumu Taniguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/701,819

(22) PCT Filed: Oct. 13, 2022

(86) PCT No.: PCT/JP2022/038200
§ 371 (c)(1),
(2) Date: Apr. 16, 2024

(87) PCT Pub. No.: WO2023/068156
PCT Pub. Date: Apr. 27, 2023

(65) Prior Publication Data

US 2024/0411262 A1 Dec. 12, 2024

(30) Foreign Application Priority Data

Oct. 20, 2021 (JP) ................................ 2021-171735

(51) Int. Cl.
*G03G 21/16* (2006.01)
*G03G 15/00* (2006.01)
*G03G 15/16* (2006.01)

(52) U.S. Cl.
CPC ....... *G03G 21/1638* (2013.01); *G03G 15/162* (2013.01); *G03G 15/165* (2013.01);
(Continued)

(58) Field of Classification Search
CPC ............... G03G 15/162; G03G 15/165; G03G 15/1665; G03G 15/1695; G03G 15/6558;
(Continued)

(56) References Cited

U.S. PATENT DOCUMENTS

2016/0170335 A1* 6/2016 Tetsuno ............ G03G 15/6558
399/316
2018/0239288 A1* 8/2018 Asami ................ G03G 15/2021
2020/0301359 A1* 9/2020 Tominaga .......... G03G 15/1695

FOREIGN PATENT DOCUMENTS

JP 2009126696 A 6/2009
JP 2018025626 A 2/2018

* cited by examiner

*Primary Examiner* — Joseph S Wong
(74) *Attorney, Agent, or Firm* — Studebaker Brackett PLLC

(57) ABSTRACT

An image forming apparatus (100) includes: an intermediate transfer belt (15B) provided in a body housing (3); an opening/closing unit (30); a second transfer roller (152) provided in the opening/closing unit (30) and in contact with the intermediate transfer belt (15B) when the opening/closing unit (30) is closed; a guide member (31) provided in the opening/closing unit (30) turnably and guiding a sheet to a contact area between the intermediate transfer belt (15B) and the second transfer roller (152); a conductive sheet (32) covering the guide member (31); and a conductive spring (33) provided in the opening/closing unit (30) and biasing the guide member (31) toward the intermediate transfer belt (15B) via the conductive sheet (32) to press the guide member (31) to the body housing (3), wherein when the opening/closing unit (30) is opened, the guide member (31) is in contact with the conductive spring (32) by gravity.

6 Claims, 9 Drawing Sheets

(52) U.S. Cl.
CPC ..... *G03G 15/1665* (2013.01); *G03G 15/1695* (2013.01); *G03G 15/6558* (2013.01); *G03G 21/168* (2013.01); *G03G 2215/00535* (2013.01)

(58) Field of Classification Search
CPC ............ G03G 21/1638; G03G 21/168; G03G 2215/00535
See application file for complete search history.

IMAGE FORMING APPARATUS

TECHNICAL FIELD

The present invention relates to an image forming apparatus.

BACKGROUND

In an electrophotographic image forming apparatus, since electrification of a sheet affects image quality, a technique for eliminating the electrification has been studied. For example, Patent Document 1 describes a sheet conveying guide having a resin guide member having a boss protruding toward a metal housing from its side surface, supported by the housing through the boss, and having a sheet conveyance surface, an electrostatic eliminating member provided on the end surface of the guide member and eliminating an electric charge charged on the sheet, and a metal compression coil spring having a natural length longer than the length of the boss, surrounding the boss and connecting the housing and the electrostatic eliminating member to ground the electrostatic eliminating member. Patent Document 2 describes a guide device including a conveying guide for guiding a recording material, a support member having a support part for rotatably supporting the conveying guide, a first torsional coil spring for biasing the conveying guide in the turning direction of the conveying guide, and a second torsional coil spring for biasing the conveying guide in the axial direction of the support part. The first torsional coil spring and the second torsional coil spring are electrically conductive, and applies different voltage to the conveying guide.

PRIOR ART DOCUMENT

Patent Documents

Patent Document 1: Japanese Patent Laid-Open No. 2009-126696

Patent Document 2: Japanese Patent Laid-Open No. 2018-25626

SUMMARY OF THE INVENTION

Problems to be Solved by the Invention

As a means of eliminating electricity before transferring the toner image to the sheet, using a guide member for guiding the sheet to the nip part of the transfer roller may be considered. For example, in the case of a color image forming apparatus, a guide member is provided on the upstream side of the nip part between the intermediate conveyance belt and the secondary transfer roller in the sheet conveying direction. The surface of the guide member is covered with a grounded conductive sheet, and when the sheet is in contact with the conductive sheet, the electricity of the sheet is eliminated.

In many cases, a configuration in which the conveyance path near the secondary transfer roller is opened is adopted in consideration of restoration work in the case where the sheet is jammed. For example, the secondary transfer roller is provided in an opening/closing unit hinged to the main body of the image forming apparatus, and the secondary transfer roller is separated from the intermediate transfer belt by opening the opening/closing unit when a sheet jam occurs.

In order to reliably ground the conductive sheet, it is desirable to have a configuration in which a spring having conductivity is pressed against the conductive sheet. However, in this configuration, when the opening/closing unit is opened/closed, the positional relationship between the conductive spring and the conductive sheet is slightly changed due to the distortion generated the in opening/closing unit, thereby causing friction between the conductive spring and the conductive sheet. The conductive sheet is weak to friction, and may wear out during repeated the opening and closing.

To provide an image forming apparatus capable of suppressing friction between a conductive sheet and a conductive spring when an opening/closing unit is opened/closed in consideration of the above circumstances.

Means of Solving the Problems

To solve the above problems, an image forming apparatus according to the present invention includes: a body housing having an opening; an image carrier provided in the opening and carrying a toner image; an opening/closing unit provided in the opening and capable of opening/closing; a transfer roller provided in the opening/closing unit and in contact with the image carrier when the opening/closing unit is closed; a guide member provided in the opening/closing unit turnably and guiding a sheet to a contact area between the image carrier and the transfer roller; a conductive sheet covering the guide member; and a conductive spring provided in the opening/closing unit and biasing the guide member toward the image carrier via the conductive sheet to press the guide member to a contact area of the body housing, wherein when the opening/closing unit is opened, the guide member is in contact with the conductive spring by gravity.

Effects of the Invention

According to the present invention, it becomes possible to suppress friction between the conductive sheet and the conductive spring when the opening/closing unit is opened and closed.

EMBODIMENT FOR CARRYING OUT THE INVENTION

Figure 1:
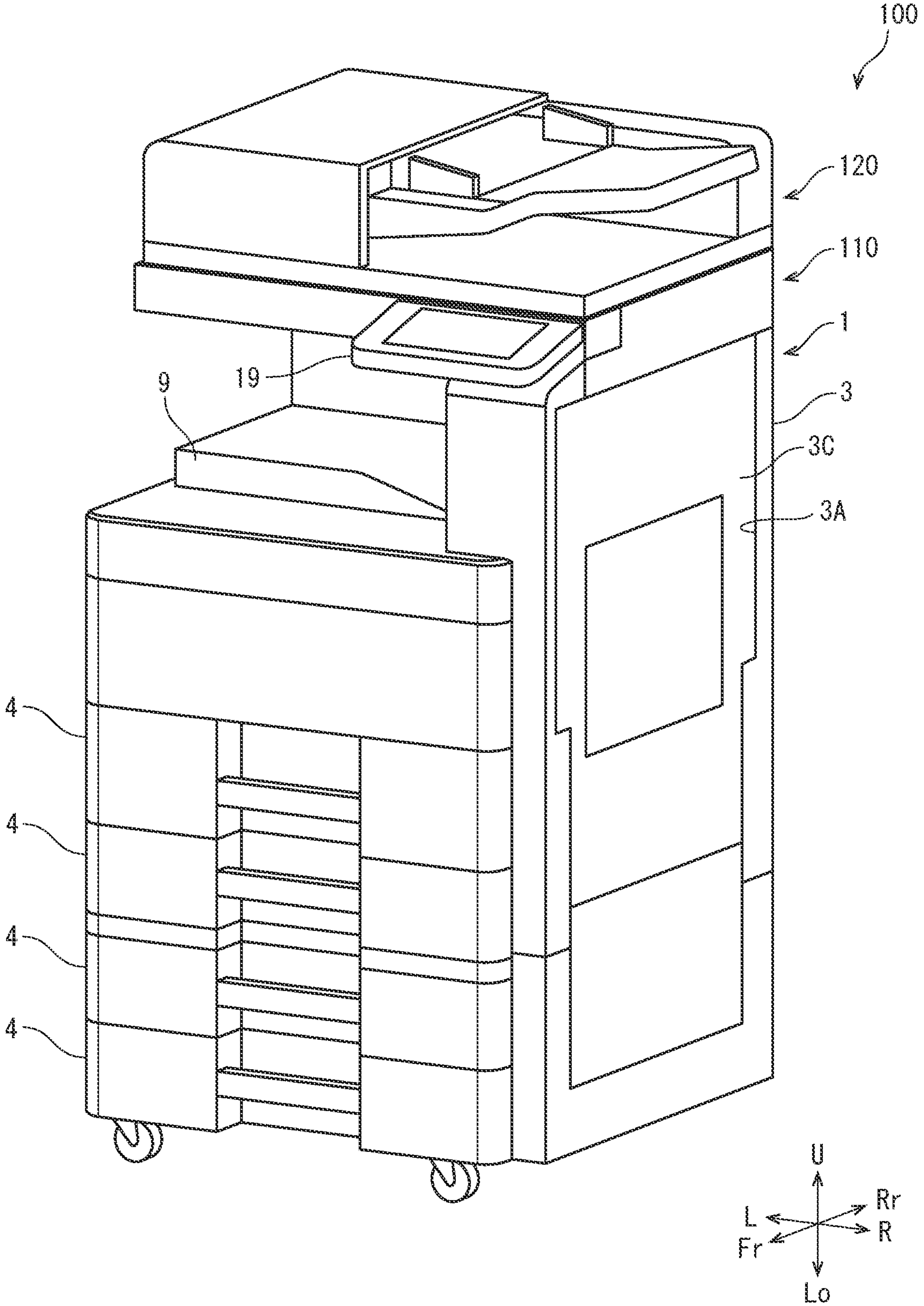
FIG. 1 is a perspective view showing an appearance of an image forming apparatus according to one embodiment of the present invention.
Figure 2:
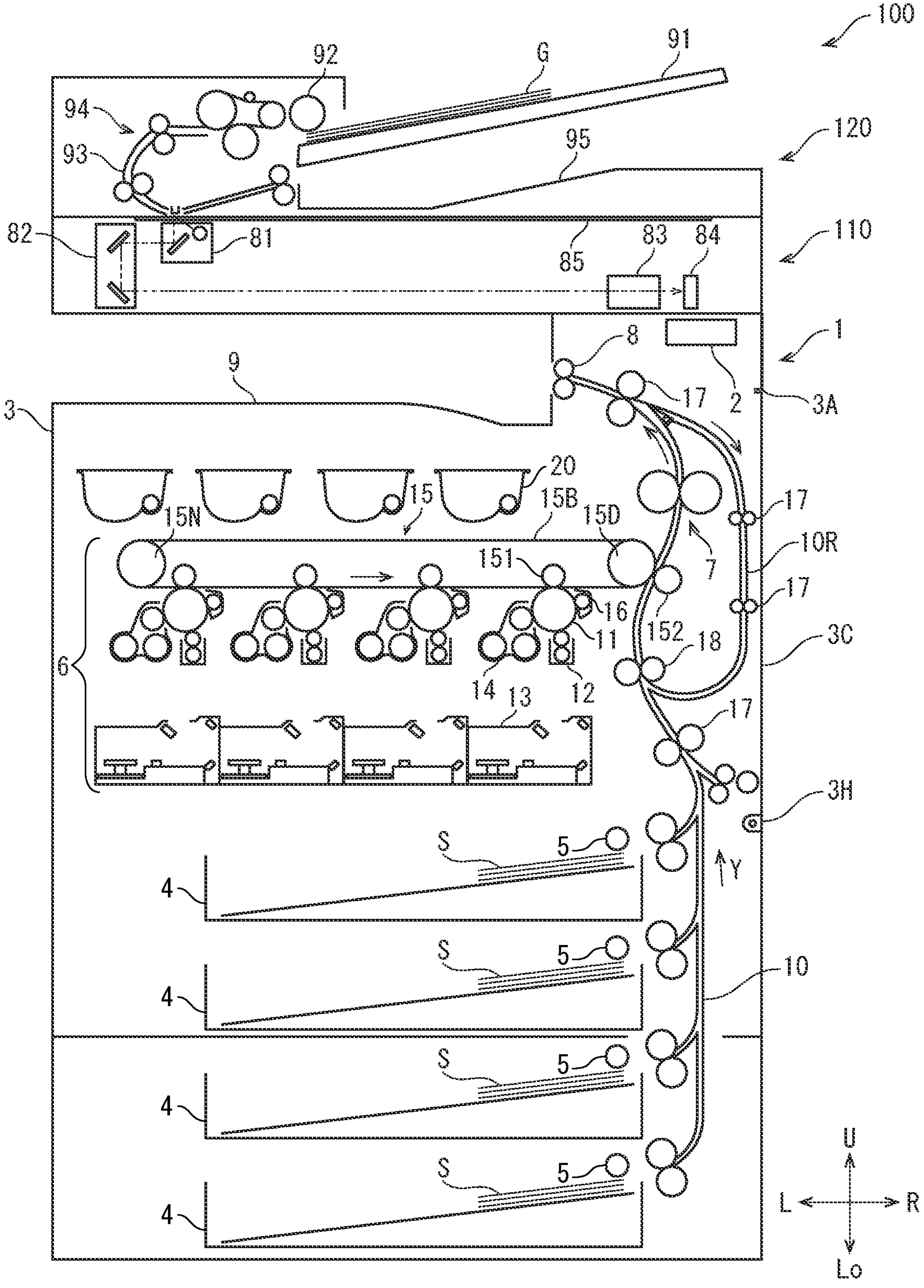
FIG. 2 is a front view schematically showing an inner structure of the image forming apparatus according to one embodiment of the present invention.

First, an entire configuration of an image forming apparatus 100 will be described. FIG. 1 is a perspective view showing the appearance of the image forming apparatus 100. FIG. 2 is a front view schematically showing the inner structure of the image forming apparatus 100. Hereinafter, the front side of the paper surface on which FIG. 2 is drawn will be referred to as the front side of the image forming apparatus 100, and the left-and-right direction will be described with reference to the direction in which the image forming apparatus 100 is viewed from the front side. In each figure, U, Lo, L, R, Fr, and Rr indicate the upper, lower, left, right, front, and rear, respectively.

The image forming apparatus 100 includes a printer 1, a scanner 110, and a document conveying device 120. The scanner 110 is provided above the printer 1, and the document conveying device 120 is provided above the scanner 110. The document conveying device 120 conveys a document along a conveyance path via a reading position of the scanner 110. The scanner 110 is a flatbed type image scanner, and generates image data by reading the document. The printer 1 forms an image based on the image data on a sheet S.

The printer 1 includes a box-shaped body housing 3 (an example of the body). In the lower portion of the inside of the body housing 3, a sheet feeding cassette 4 in which the sheet S is stored and a sheet feeding roller 5 which feeds the sheet S from the sheet feeding cassette 4 rightward are provided. An image forming device 6 which forms a toner image in an electrophotographic manner is provided above the sheet feeding cassette 4, and a fixing device 7 which fixes the toner image to the sheet S is provided on the right and upper side of the image forming device 6. Above the fixing device 7, a sheet discharge roller 8 which discharges the sheet S on which the toner image is fixed and a sheet discharge tray 9 on which the discharged sheet S is stacked are provided.

Inside the body housing 3, the conveyance path 10 along which the sheet S is conveyed from the sheet feeding roller 5 through the image forming device 6 and the fixing device 7 to the sheet discharge roller 8 is provided. The conveyance path 10 is mainly formed of plate-like members facing each other via a gap through which the sheet S is passed, and conveyance rollers 17 which conveys the sheet S while holding the sheet S are provided at a plurality of positions in the conveying direction Y. A registration roller 18 is provided on the upstream side of the image forming device 6 in the conveying direction Y. On the right side of the fixing device 7, an inversion conveyance path 10R is provided which branches from the conveyance path 10 on the downstream side of the fixing device 7 in the conveying direction Y, and merges with the conveyance path 10 on the upstream side of the registration roller 18 in the conveying direction Y.

The image forming device 6 includes a photosensitive drum 11 whose potential changes by irradiation with light, a charging device 12 which charges the photosensitive drum 11, an exposure device 13 which emits laser light corresponding to the image data, a developing device 14 which supplies a toner to the photosensitive drum 11, an intermediate transfer unit 15 which transfers the toner image from the photosensitive drum 11 to the sheet S, and a cleaning device 16 which removes the toner remaining on the photosensitive drum 11. The intermediate transfer unit 15 includes an endless intermediate transfer belt 15B wound around a driving roller 15D and a driven roller 15N, a primary transfer roller 151 facing the inner circumferential surface of the intermediate transfer belt 15B at a position corresponding to the photosensitive drum 11 and generating a primary transfer bias, and a secondary transfer roller 152 facing the outer circumferential surface of the intermediate transfer belt 15B at a position corresponding to the driving roller 15D and generating a secondary transfer bias. A toner container 20 which supplies the toner to the developing device 14 is connected to the developing device 14.

The image forming device 6 is provided with four sets of the photosensitive drum 11, the charging device 12, the exposure device 13, the developing device 14, the primary transfer roller 151, the cleaning device 16, and the toner container 20, and forms a color image by overlapping the four color toner images on the intermediate transfer belt 15B. The present invention may be applied to an image forming apparatus for forming a color image with three or fewer colors or five or more colors of the toner.

A control part 2 includes an arithmetic part and a storage part. The arithmetic unit is, for example, a CPU (Central Processing Unit). The storage part includes a storage medium such as ROM (Read Only Memory), RAM (Random Access Memory), EEPROM (Electrically Erasable Programmable Read Only Memory), and the like. The arithmetic part reads control program stored in the storage part and executes various processes. The control part 2 may be implemented only by an integrated circuit without using software.

An operation panel 19 is provided on the front side of the scanner 110. The operation panel 19 includes a display panel, a touch panel superposed on a display surface of the display panel, and a keypad adjacent to the display panel. The control part 2 displays a screen representing an operation menu, a status or the like of the printer 1 and the scanner 110 on the display panel, and controls each part of the printer 1 and the scanner 110 in accordance with the operation detected by the touch panel and the keypad.

The basic image forming operation of the printer 1 is as follows. When a one-side print job is inputted to the printer 1 from an external computer or the like, the sheet feeding roller 5 feeds the sheet S from the sheet feeding cassette 4 to the conveyance path 10, the registration roller 18 whose rotation is stopped corrects the skew of the sheet S, and the registration roller 18 sends the sheet S to the image forming device 6 at a predetermined timing. In the image forming device 6, the charging device 12 charges the photosensitive drum 11 to a predetermined potential, the exposure device 13 writes an electrostatic latent image on the photosensitive drum 11, the developing device 14 develops the electrostatic latent image using the toner supplied from the toner container 20 to form a toner image, the primary transfer roller 151 transfers the toner image to the intermediate transfer belt 15B, and the secondary transfer roller 152 transfers the toner image to the sheet S. Subsequently, the fixing device 7 fixes the toner image to the sheet S by melting the toner image while holding and conveying the sheet S, and the sheet discharge roller 8 discharges the sheet S to the sheet discharge tray 9. The cleaning device 16 removes the toner remaining on the photosensitive drum 11. In the case of both-side printing, the sheet S on which the toner image is fixed on the first surface is fed to the conveyance path 10 via the inversion conveyance path 10R, and the toner image is transferred to the second surface.

Figure 3:
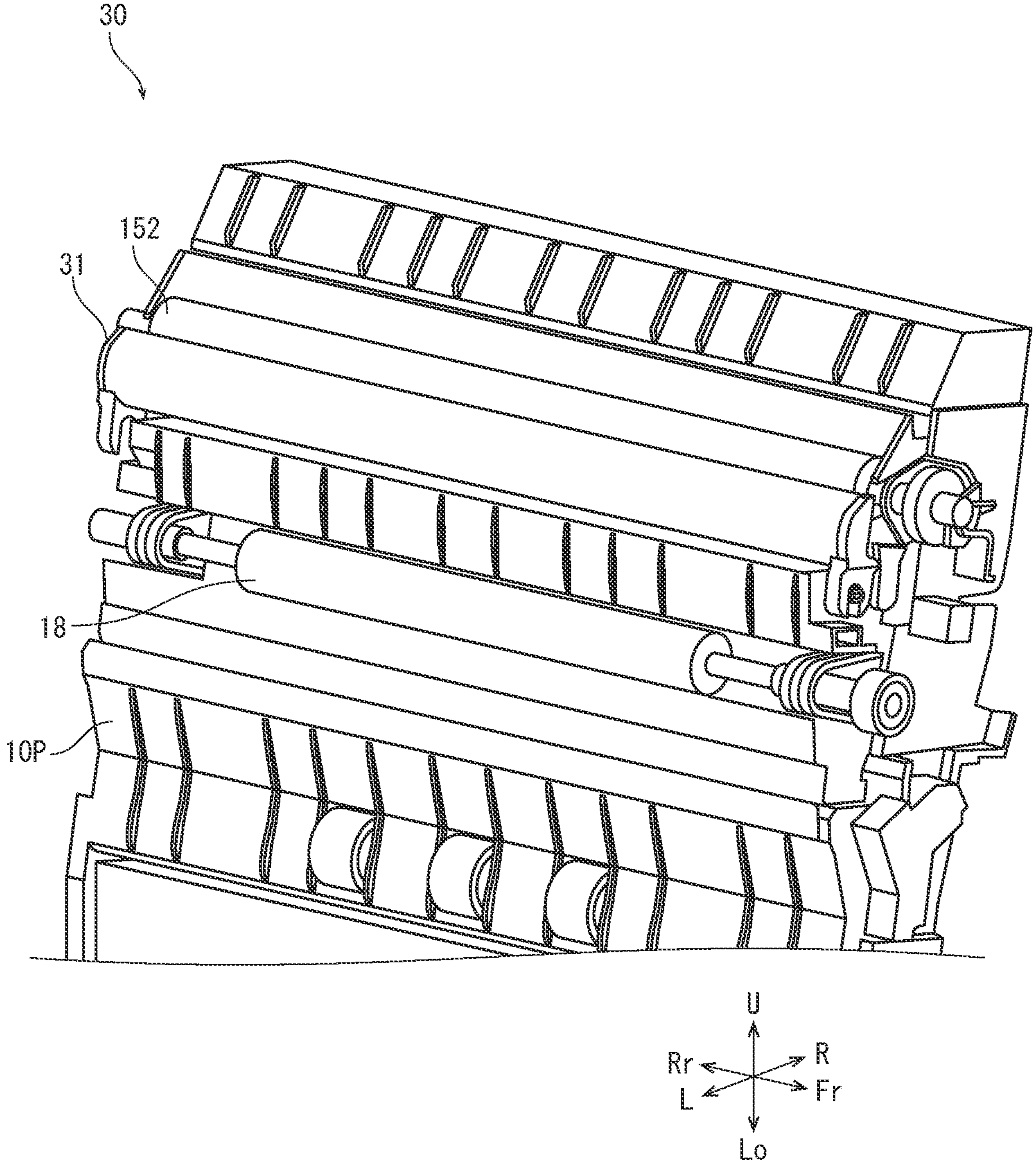
FIG. 3 is a perspective view showing an opening/closing unit according to one embodiment of the present invention.
Figure 4:
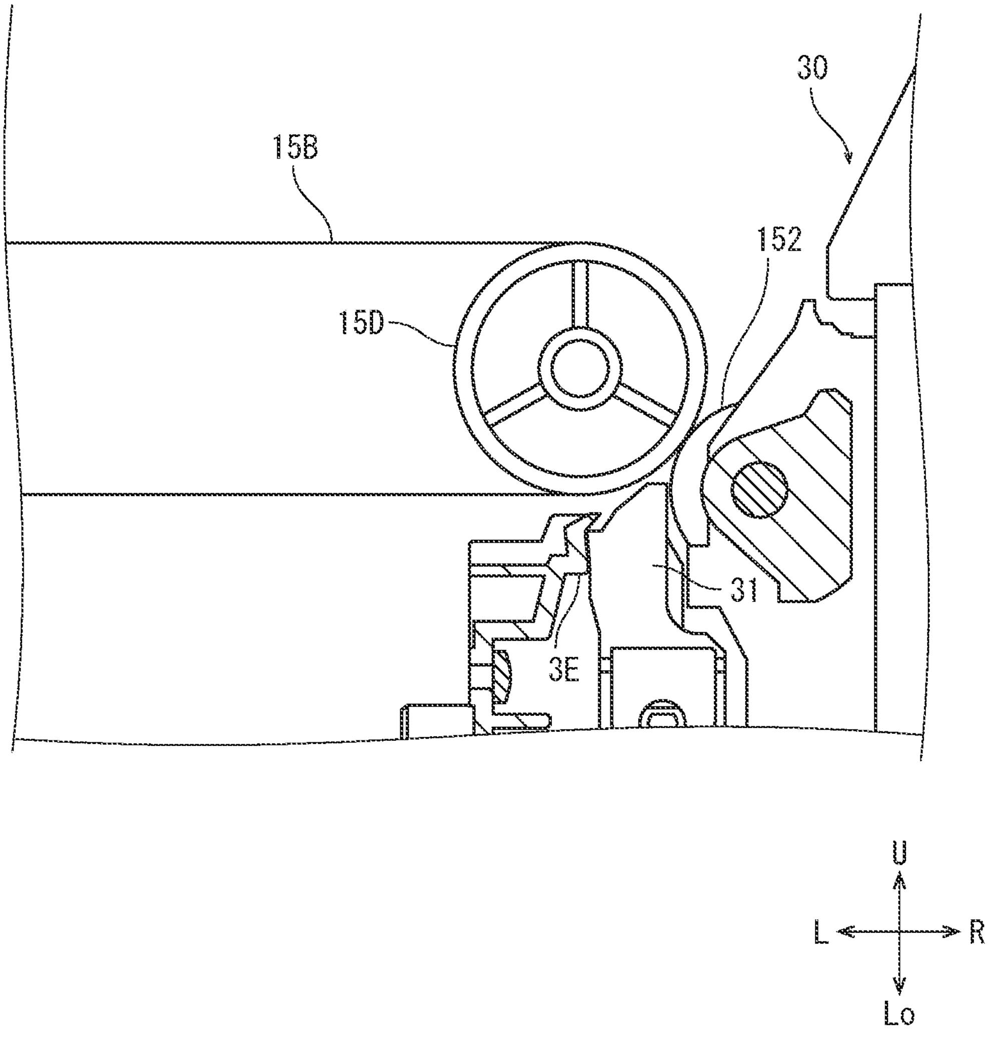
FIG. 4 is a cross-sectional view showing a guide member and its periphery according to one embodiment of the present invention.
Figure 5:
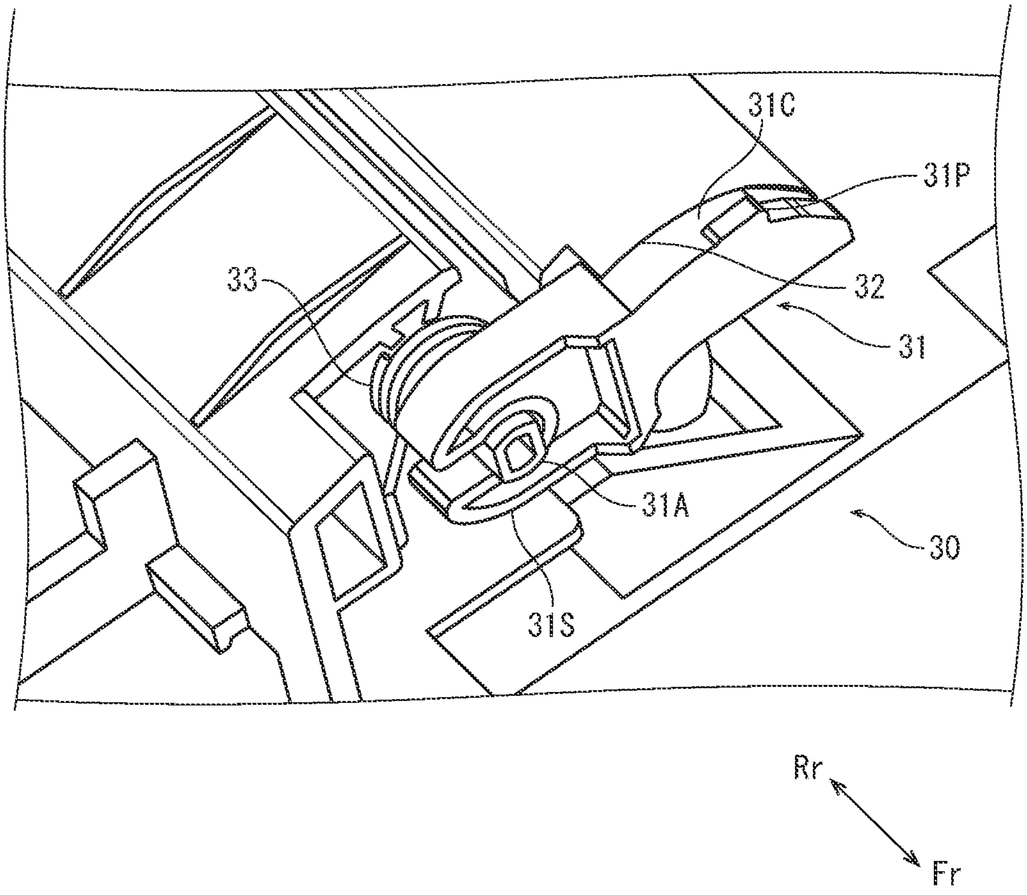
FIG. 5 is a perspective view showing the guide member and its periphery according to one embodiment of the present invention.
Figure 6:
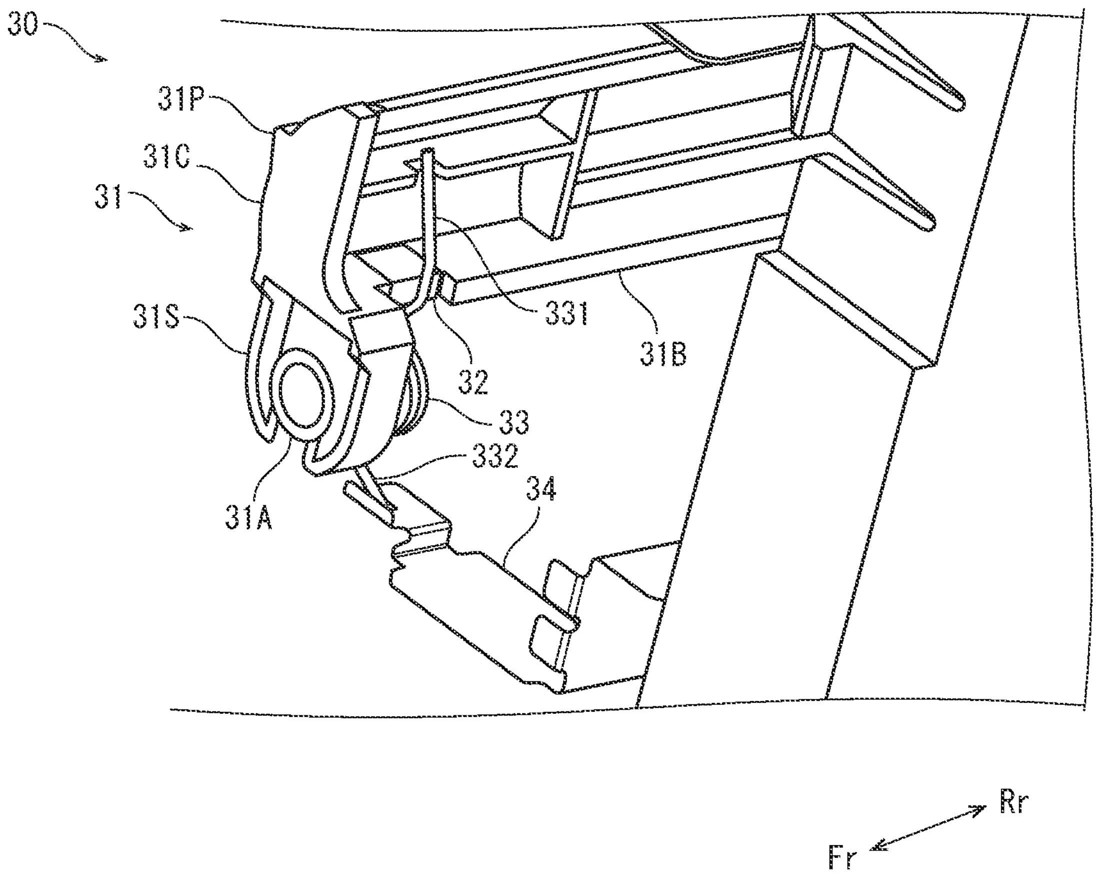
FIG. 6 is a perspective view showing the guide member and its periphery according to one embodiment of the present invention.
Figure 7:
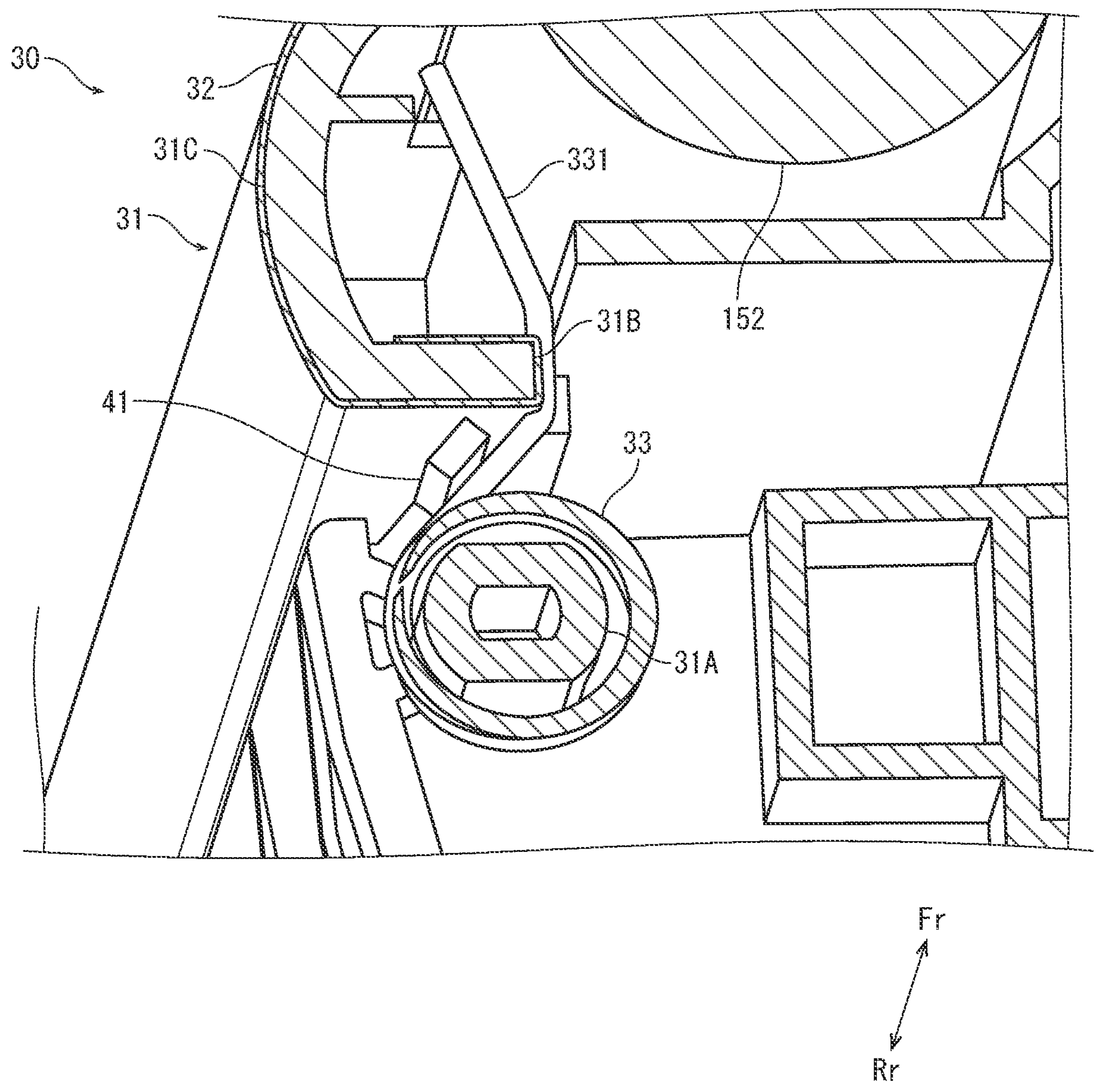
FIG. 7 is a cross-sectional view showing the guide member and its periphery according to one embodiment of the present invention.
Figure 8:
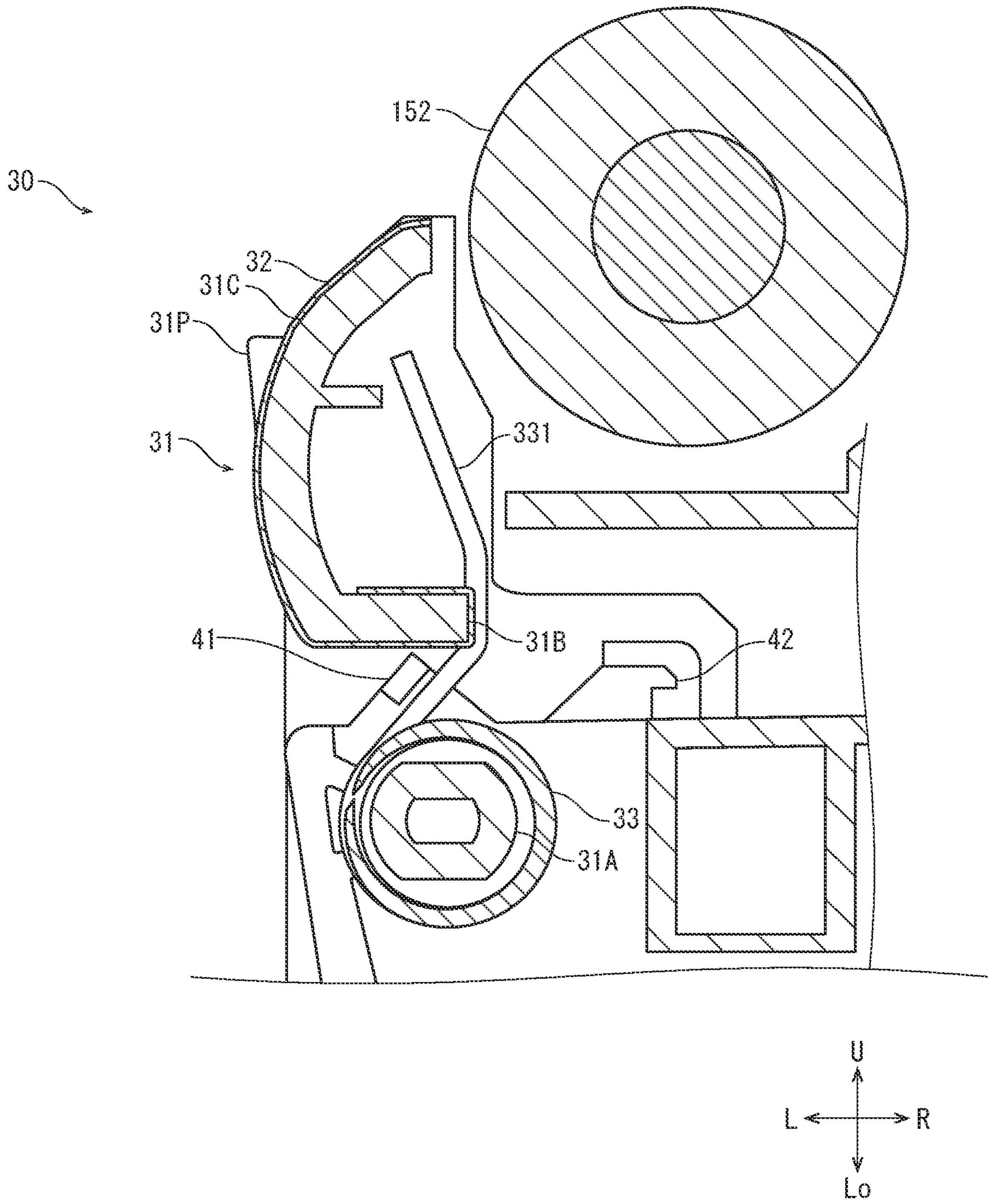
FIG. 8 is a cross-sectional view showing the closed opening/closing unit according to one embodiment of the present invention.
Figure 9:
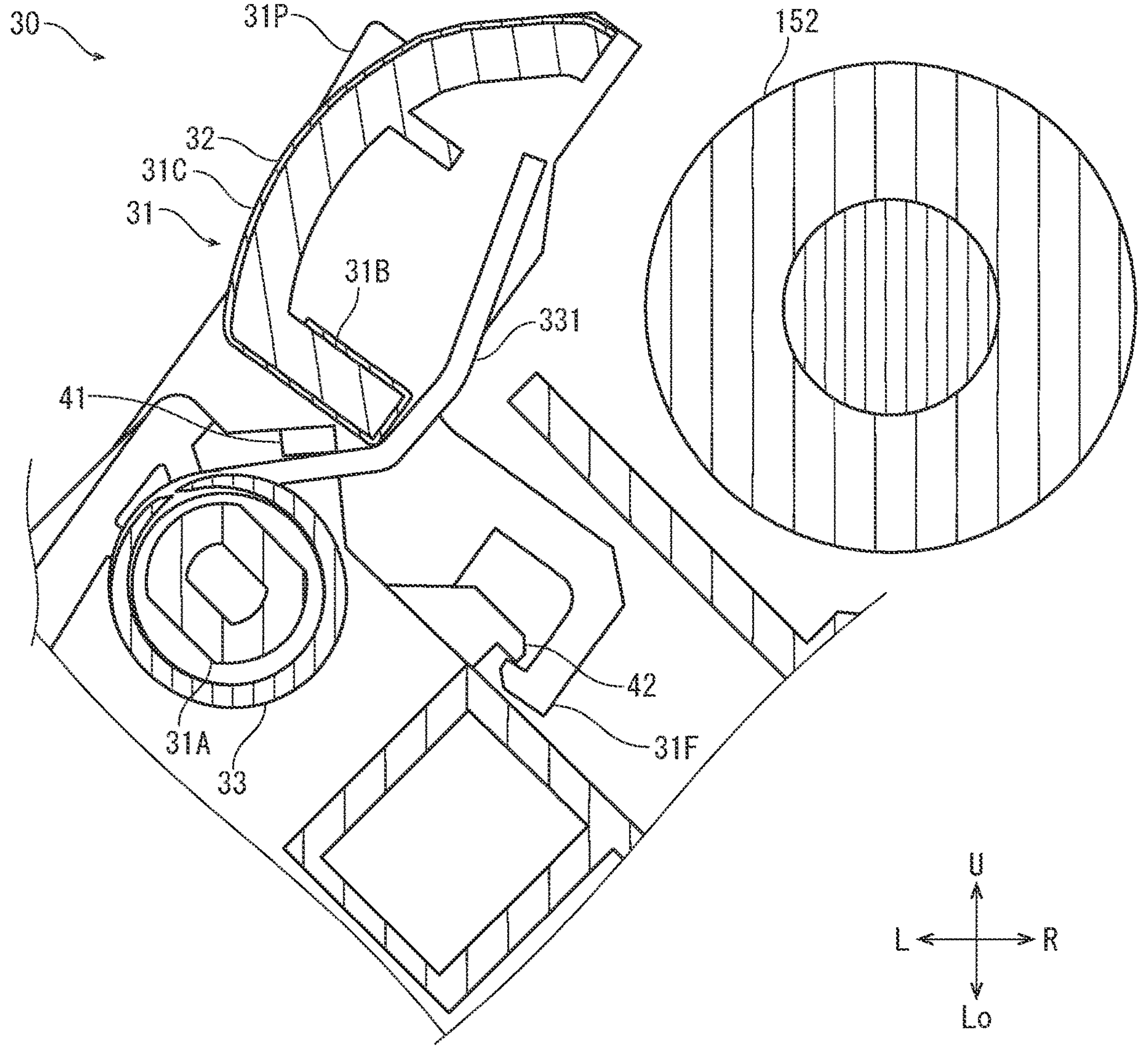
FIG. 9 is a cross-sectional view showing the opened opening/closing unit according to one embodiment of the present invention.

Next, the image forming apparatus 100 will be described in detail. FIG. 3 is a perspective view showing an opening/closing unit 30. FIG. 4 is a cross-sectional view showing a guide member 31 and its periphery. FIG. 5 and FIG. 6 are perspective views showing the guide member 31 and its periphery. FIG. 7 is a cross-sectional view showing the guide member 31 and its periphery. FIG. 8 is a cross-sectional view showing the closed opening/closing unit 30. FIG. 9 is a cross-sectional view showing the opened opening/closing unit 30.

The image forming apparatus 100 includes: the body housing 3 (an example of the main body) having an opening 3A; the intermediate transfer belt 15B (an example of the image carrier) carrying the toner image; an opening/closing unit 30 provided in the opening 3A and capable of opening/closing; the secondary transfer roller 152 (an example of the transfer roller) provided in the opening/closing unit 30 and in contact with the intermediate transfer belt 15B when the opening/closing unit 30 is closed; a guide member 31 provided in the opening/closing unit 30 turnably and guiding the sheet S to a contact area between the intermediate transfer belt 15B and the secondary transfer roller 152; a conductive sheet 32 covering the guide member 31; and a conductive spring 33 provided in the opening/closing unit 30 and biasing the guide member 31 toward the intermediate transfer belt 15B via the conductive sheet 32 to press the guide member 31 to a contact area 3E of the body housing 3 when the opening/closing unit 30 is closed. When the opening/closing unit 30 is opened, the guide member 31 is in contact with the conductive spring 33 by gravity.

The rectangular opening 3A is provided on the right side surface of the body housing 3 (see FIG. 1, FIG. 2). The opening 3A is provided with a rectangular openable and closable cover 3C. The lower end portion of the cover 3C is coupled to the lower end portion of the opening 3A through a hinge 3H. By opening the cover 3C, the sheet S jammed in the conveyance path 10 can be removed and the inside can be maintained.

[Opening/closing Unit] The openable and closable opening/closing unit 30 (see FIG. 3) is provided on the left side of the cover 3C. The lower end portion of the opening/closing unit 30 is connected to the body housing 3 through a hinge (not shown). When the cover 3C is opened, it becomes possible to open the opening/closing unit 30. The opening/closing unit 30 may be integrated with the cover 3C.

The opening/closing unit 30 includes the inversion conveyance path 10R, the secondary transfer roller 152, one of the pair of rollers constituting the registration roller 18, the guide member 31, and the right plate-like member 10P among the plate-like members 10P facing in the left-and-right direction and forming the conveyance path 10 (see FIG. 2, FIG. 3). The secondary transfer roller 152 and the guide member 31 are provided above one roller of the rollers constituting the registration roller 18. When the opening/closing unit 30 is closed, the secondary transfer roller 152 is in contact with the intermediate transfer belt 15B, and when the opening/closing unit 30 is opened, the secondary transfer roller 152 is separated from the intermediate transfer belt 15B.

[Guide Member] As shown in FIG. 3, the guide member 31 is provided on the upstream side of the contact area between the secondary transfer roller 152 and the intermediate transfer belt 15B in the conveying direction Y. As shown in FIG. 6, FIG. 8 and FIG. 9, the guide member 31 includes: an elongated curved portion 31C whose longitudinal direction is along a width direction of the sheet S intersecting the conveying direction Y; a bottom portion 31B protruding rightward from the lower end portion of the curved portion 31C; protruding portions 31P protruding toward the intermediate transfer belt 15B from both end portions of the curved portion 31C in the width direction; and support portions 31S provided at the lower portions of both end portions of the curved portion 31C in the width direction. The support portions 31S are coupled to the opening/closing unit 30 through turning shafts 31A whose axial direction is along the width direction. The curved portion 31C is curved so that its cross-section in the width direction bulges toward the intermediate transfer belt 15B, and the curved portion 31C is in contact with the right side surface of the sheet S conveyed from below to guide the sheet S. The body housing 3 is provided with the contact area 3E with which the protruding portion is 31P in contact when the opening/closing unit 30 is closed.

[Conductive Sheet] The conductive sheet 32 is, for example, a sheet made of conductive resin, and covers the guide member 31. As shown in FIG. 8 and FIG. 9, the conductive sheet 32 is provided over the curved portion 31C and the lower, right, and upper surfaces of the bottom portion 31B of the guide member 31.

[Conductive Spring] The conductive spring 33 is, for example, a torsional coil spring made of metal, and, as shown in FIG. 6 and FIG. 7, wound around a turning shaft 31A of the guide member 31. A first end portion 331 of the steel wire constituting the conductive spring 33 is disposed upward, and is in contact with the right surface of the bottom portion 31B of the guide member 31. A second end portion 332 of the steel wire is disposed on the right side, and is in contact with a leaf spring-like ground member 34 (see FIG. 6) provided in the opening/closing unit 30. When the second end portion 332 is applied with a reaction force from the ground member 34, the first end portion 331 biases the bottom portion 31B of the guide member 31 leftward.

[First Regulating Member] A first regulating member 41 is provided in the opening/closing unit 30, and regulates an elastic deformation of the conductive spring 33 toward the guide member 31 to a predetermined amount. As shown in FIG. 7, the first regulating member 41 is disposed between the bottom portion 31B and the turning shaft 31A of the guide member 31. When the opening/closing unit 30 is closed (see FIG. 8), the first regulating member 41 faces the first end portion 331 of the conductive spring 33 with a predetermined gap. When the opening/closing unit 30 is opened (see FIG. 9), the conductive spring 33 is in contact with the first regulating member 41 so that the elastic deformation of the conductive spring 33 toward the guide member 31 is regulated to the predetermined amount.

[Second Regulating Member] A second regulating member 42 is provided in the opening/closing unit 30, and when the opening/closing unit 30 is opened, the turning of the guide member 31 toward the intermediate transfer belt 15B is regulated in a state where the guide member 31 is brought into contact with the conductive spring 33, elastically deformed to the predetermined amount, by gravity. As shown in FIG. 8 and FIG. 9, the second regulating member 42 is provided on the right side of the conductive spring 33 and above the turning shaft 31A. The guide member 31 is provided with an opposite portion 31F (see FIG. 9) facing the second regulating member 42. When the opening/closing unit 30 is closed (see FIG. 8), the opposite portion 31F and the second regulating member 42 face each other at an interval. When the opening/closing unit 30 is opened (see FIG. 9), the opposite portion 31F is in contact with the second regulating member 42, so that the turning of the guide member 31 toward the intermediate transfer belt 15B is regulated.

Next, the operation of the above configuration will be described. As shown in FIG. 8, when the opening/closing unit 30 is closed, the protruding portion 31P of the guide member 31 is pressed against the contact area 3E (see FIG. 4), and the conductive spring 33 is pressed against the conductive sheet 32. At this time, the first regulating member 41 faces the first end portion 331 of the conductive spring 33 with a predetermined gap. Further, the opposite portion 31F and the second regulating member 42 face each other at an interval. A predetermined gap is provided between the conductive sheet 32 covering the curved portion 31C of the guide member 31 and the intermediate transfer belt 15B, and the sheet S is conveyed while in contact with the conductive sheet 32, so that the electricity of the sheet S is eliminated.

On the other hand, when the opening/closing unit 30 is opened, as shown in FIG. 9, since the protruding portion 31P of the guide member 31 is separated from the contact area 3E, the conductive spring 33 pushes the guide member 31 toward the intermediate transfer belt 15B. At this time, the conductive spring 33 is in contact with the first regulating member 41, so that the elastic deformation of the conductive spring 33 toward the guide member 31 is regulated to the predetermined amount. Further, the opposite portion 31F is in contact with the second regulating member 42, so that the turning of the guide member 31 toward the intermediate transfer belt 15B is regulated. Since the bottom portion 31B of the guide member 31 comes into contact with the conductive spring 33 through the conductive sheet 32 by gravity, only a load by gravity acts between the conductive sheet 32 and the conductive spring 33. As described above, since the conductive spring 33 does not bias the guide member 31 when the opening/closing unit 30 is opened, friction between the conductive sheet 32 and the conductive spring 33 when the opening/closing unit 30 is opened/closed can be suppressed.

The image forming apparatus 100 according to the present embodiment described above includes: the body housing 3 (an example of the main body) having the opening 3A; the intermediate transfer belt 15B (an example of the image carrier) carrying the toner image; the opening/closing unit 30 provided in the opening 3A and capable of opening/closing; the secondary transfer roller 152 (an example of the transfer roller) provided in the opening/closing unit 30 and in contact with the intermediate transfer belt 15B when the opening/closing unit 30 is closed; the guide member 31 provided in the opening/closing unit 30 turnably and guiding the sheet S to the contact area between the intermediate transfer belt 15B and the secondary transfer roller 152; the conductive sheet 32 covering the guide member 31; and the conductive spring 33 provided in the opening/closing unit 30 and biasing the guide member 31 toward the intermediate transfer belt 15B via the conductive sheet 32 to press the guide member 31 to the contact area 3E of the body housing 3. When the opening/closing unit 30 is opened, the guide member 31 is in contact with the conductive spring by gravity. According to this configuration, since the conductive spring 33 does not bias the guide member 31 when the opening/closing unit 30 is opened, friction between the conductive sheet 32 and the conductive spring 33 when the opening/closing unit 30 is opened/closed can be suppressed.

Further, according to the image forming apparatus 100 according to the present embodiment, the opening/closing unit 30 is provided with the first regulating member 41 which regulates the elastic deformation of the conductive spring 33 toward the guide member 31 to the predetermined amount. And, when the opening/closing unit 30 is opened, the guide member 31 is in contact with the conductive spring 33, elastically deformed to a predetermined amount, by gravity. Therefore, friction between the conductive sheet 32 and the conductive spring 33 can be suppressed as compared with the case where the elastic deformation of the conductive spring 33 is not regulated to the predetermined amount.

Further, according to the image forming apparatus 100 according to the present embodiment, the opening/closing unit 30 is provided with the second regulating member 42 which regulates the turning of the guide member 31 toward the intermediate transfer belt 15B in the state that the guide member 31 is brought into contact with the conductive spring 33, elastically deformed to the predetermined amount, by gravity, when the opening/closing unit 30 is opened. Therefore, friction between the conductive sheet 32 and the conductive spring 33 can be suppressed as compared with the case where the turning of the guide member 31 is not regulated.

According to the image forming apparatus 100 according to the present embodiment, the image carrier is the intermediate transfer belt 15B wound around a plurality of rollers. Therefore, friction between the conductive sheet 32 and the conductive spring 33 when the opening/closing unit 30 is opened/closed can be suppressed in the image forming apparatus 100 for forming a color image.

The above embodiment may be modified as follows.

Although the above embodiment shows an example in which the conductive spring 33 is a torsion coil spring, a compression coil spring, a leaf spring, or the like may be used as the conductive spring 33.

Although the above embodiment shows an example in which the cover 3C is turned around the hinge 3H provided at the lower end portion, the cover 3C may be opened and closed by sliding in the left-and-right direction through a slide rail (not shown).

Although the above embodiment shows an example in which the image carrier is the intermediate transfer belt 15B is shown, the image carrier may be a photosensitive drum provided in an image forming device for forming a monochrome image.

The invention claimed is:

1. An image forming apparatus comprising:

a body housing having an opening;

an image carrier provided in the opening and carrying a toner image;

an opening/closing unit provided in the opening and capable of opening/closing;

a transfer roller provided in the opening/closing unit and in contact with the image carrier when the opening/closing unit is closed;

a guide member provided in the opening/closing unit turnably and guiding a sheet to a contact area between the image carrier and the transfer roller;

a conductive sheet covering the guide member; and a conductive spring provided in the opening/closing unit and biasing the guide member toward the image carrier via the conductive sheet to press the guide member to a contact area of the body housing, wherein when the opening/closing unit is opened, the guide member is in contact with the conductive spring by gravity.

2. The image forming apparatus according to claim 1, comprising:

a first regulating member provided in the opening/closing unit and regulating an elastic deformation of the conductive spring toward the guide member to a predetermined amount, wherein when the opening/closing unit is opened, the guide member is in contact with the conductive spring, which elastically deformed to the predetermined amount, by gravity.

3. The image forming apparatus according to claim 2, comprising:

a second regulating member provided in the opening/closing unit, wherein when the opening/closing unit is opened, the second regulating member regulates a turning of the guide member toward the image carrier in a state that the guide member is brought into contact with the conductive spring, which is elastically deformed to the predetermined amount, by gravity.

4. The image forming apparatus according to claim 1, wherein the image carrier is an intermediate transfer belt wound around a plurality of rollers.

5. The image forming apparatus according to claim 1, wherein the opening/closing unit is turnably supported by the body housing.

6. The image forming apparatus according to claim 1, wherein the conductive spring is a torsion coil spring wound around a turning shaft of the guide member.

* * * * *